United States Patent
Leung et al.

(10) Patent No.: US 8,701,547 B2
(45) Date of Patent: Apr. 22, 2014

(54) COFFEE MAKER WITH COFFEE BEAN GRINDER

(75) Inventors: Chi Wah Leung, Hong Kong (CN); Shek Chuen Luk, Hong Kong (CN); Kam Ming Tsang, Hong Kong (CN)

(73) Assignee: Simatelex Manufactury Co. Ltd., Chaiwan (HK)

( * ) Notice: Subject to any disclaimer, the term of this patent is extended or adjusted under 35 U.S.C. 154(b) by 353 days.

(21) Appl. No.: 12/718,282

(22) Filed: Mar. 5, 2010

(65) Prior Publication Data
US 2011/0217437 A1    Sep. 8, 2011

(51) Int. Cl.
*A47J 31/42* (2006.01)
*A47J 31/58* (2006.01)
*A23F 5/26* (2006.01)

(52) U.S. Cl.
USPC .............................. 99/285; 99/286; 426/333

(58) Field of Classification Search
USPC ........... 99/285, 286, 279, 300, 320; 426/432, 426/433
See application file for complete search history.

(56) References Cited

U.S. PATENT DOCUMENTS

| 4,196,658 A | 4/1980 | Takagi et al. |
| 4,459,524 A | 7/1984 | Oota et al. |
| 5,287,795 A * | 2/1994 | Enomoto .................. 99/280 |
| 5,462,236 A * | 10/1995 | Knepler ..................... 241/34 |
| 8,371,211 B2 * | 2/2013 | Nosler et al. .............. 99/279 |
| 2010/0303983 A1 * | 12/2010 | Rodriguez et al. ......... 426/431 |

FOREIGN PATENT DOCUMENTS

| JP | 57100314 A * | 6/1982 | ............. G01F 23/10 |
| JP | 2006125973 A * | 5/2006 | |
| WO | WO 2007106947 A1 * | 9/2007 | |

* cited by examiner

*Primary Examiner* — Jianying Atkisson
(74) *Attorney, Agent, or Firm* — Leydig, Voit & Mayer, Ltd.

(57) ABSTRACT

A coffee maker has a water reservoir, an in-line water heater, a brew basket for receiving coffee grounds, a water passage between the water reservoir and the brew basket, a water level sensor located in the water reservoir, a water level indicator, and a controller in communication with the water level sensor and the water level indicator. The passage passes through the in-line water heater for delivering heated water to the brew basket. The controller activates the water level indicator in response to a signal from the water level sensor. A method of making coffee in the coffee maker includes determining, in the controller, an operating condition for a coffee bean grinder and operating the coffee bean grinder based on the operating condition to grind coffee beans and produce a quantity of ground coffee beans.

5 Claims, 6 Drawing Sheets

COFFEE MAKER WITH COFFEE BEAN GRINDER

FIELD OF THE INVENTION

The present invention relates to coffee makers and in particular to drip-type coffee makers, and to methods of operating such coffee makers.

BACKGROUND TO THE INVENTION

One method of making coffee includes passing heated water through coffee grounds in order to infuse the water with coffee flavor and aroma. A common type of coffee maker that employs this method is the so-called "drip-type" or "filter" coffee maker. Filter coffee makers comprise a water reservoir and a brew basket for receiving coffee grounds. A delivery tube or other water passage takes water from the water reservoir, through an in-line water heater, and delivers it to a spreader above coffee grounds in the brew basket. The heated water passes through the coffee grounds and in to a carafe, cup or other vessel.

The art to making good coffee relies not only on the correct water temperature and wetting time, but also on the quantity of water and ground coffee used in preparing the brew. Opinions vary widely but organizations such as the National Coffee Service Association recommend a ratio of approximately 11 grams of coffee to 8 fluid ounces of water.

One of the problems with known coffee makers, and in particular domestic or home use coffee makers, is the need to constantly measuring out exact quantities of water and coffee when making a brew. It is often the case that the number of cups, or quantity of coffee, may varies from brew to brew. Thus, there is a need to constantly adjust measurements and to work out exact quantities for each brew. One solution practiced by many users of domestic or home coffee makers is to measure out a known fixed quantity of coffee and water for each brew. For example a user may place three scoops of coffee in the brew basket for one full load of water. This can result in coffee wastage or in more extreme cases a shortage of coffee requiring a second brew which may only be partly consumed. As a result many users resort to rule of thumb guides such as "one scoop per cup plus one for the pot". Such methods are imprecise often resulting in variable brew quality which detracts from the coffee drinking experience.

SUMMARY OF THE INVENTION

It is an object of the present invention to overcome, or at least eliminate, the above-mentioned problem with known coffee makers, in particular domestic or home use coffee makers, by providing a coffee maker and a method of operating coffee maker which may be used to produce a consistent strengthen and flavor of coffee from brew to brew regardless of whether a small or large number of cups is being prepared.

According to a first aspect of the invention there is disclosed herein a coffee maker having a water reservoir, an in-line water heater, a brew basket for receiving coffee grounds, a water passage between the reservoir and the brew basket, a water level sensor located in the water reservoir, a water level indicator, and a controller in communication with the water level sensor and water level indicator. The passage passes through the in-line water heater for delivering heated water to the brew basket. The controller is configured to activate the water level indicator in response to a signal from the water level sensor.

The water level sensor comprises a float and a variable resistance device operated by a position of the float. The method of claim 1 wherein the water level indicator comprises a plurality of lights independently controllable by the controller.

In some embodiments the coffee maker may also include a coffee bean grinder in communication with the brew basket and operable by an electric motor controlled by the controller. The controller is configured to determine an operating time for the motor based on the signal from the water level sensor.

In some embodiments the coffee maker may also include a user input having two or more user selectable preferences. The controller is in communication with the user input and is configured to determine the operating time for the motor based on the signal from the water level sensor and a second signal from the user input.

The coffee bean grinder can be configured to produce a known quantity of coffee beans in a known time of operation.

According to a second aspect of the invention there is disclosed herein a method of making coffee in the coffee maker disclosed above. The method involves receiving at the controller a first signal indicative of quantity of water in the reservoir, determining an operating condition for the bean grinder and operating the bean grinder based on the condition to grind a quantity of coffee grounds, heating the quantity of water and passing the heated water through the quantity of coffee grounds. Typically, although not exclusively, the operating condition is an operating time of the bean grinder, In some embodiments the method involves receiving at the controller a first signal indicative of quantity of water in the reservoir, receiving a second signal indicative of a user input, determining in the controller an operating condition for the bean grinder based on the first and second signals and operating the bean grinder based on the condition to grind a quantity of coffee grounds, heating the quantity of water and passing the heated water through the quantity of coffee grounds.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

Figure 1:
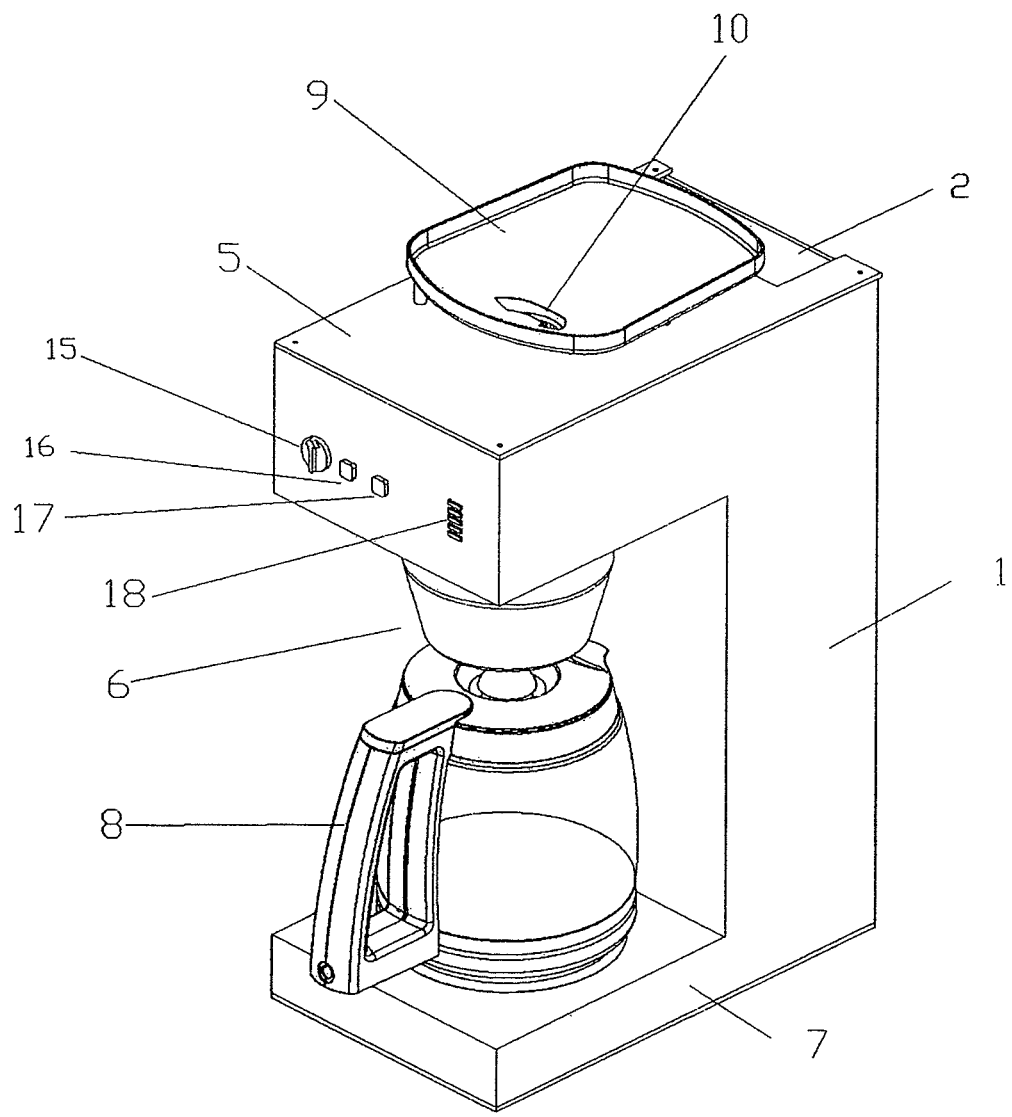
FIG. 1 is an isometric view of the coffee maker according to the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Referring to FIGS. 1 through 5, there is shown a coffee maker according to the invention comprising a coffee maker housing having a main body portion (1) housing a water supplying reservoir (2), an in-line water heater (3) and a water delivery passage (4). The main body (1) of the housing also has a head portion (5) to the lower side of which is attached a brew basket (6). On a lower part of the body is a base portion (7) which supports a carafe (8) below the brew basket (6). In use, water from the supplying reservoir (2) is heated by the in-line water heater (3) and passes up the deliver passage (4) to the brew basket (6), which contains a quantity of coffee grounds. The heated water passes through the coffee grounds, is infused with coffee flavour and aroma and collected in the carafe (8).

Located on the top of the head portion (5) is a bean hopper (9) having an opening (10) at its lowermost point. The bean hopper (9) can be arranged to hold hole coffee beans or to accept a coffee bean container such that, in either case, coffee beans can pass through the opening (10) in the lower part of the hopper (9). Located within the head (5) of the coffee maker is a coffee bean grinder (21) which communicates with both the opening (10) in the bean hopper and with the brew basket (6). The coffee bean grinder (21) is of a type known in the art and is operated by an electric motor (22). When the motor (22) is energized the grinder (21) operates drawing beans from the bean hopper (9) through opening (10) grinding the beans into coffee grounds which fall into the brew basket (6).

Figure 5:
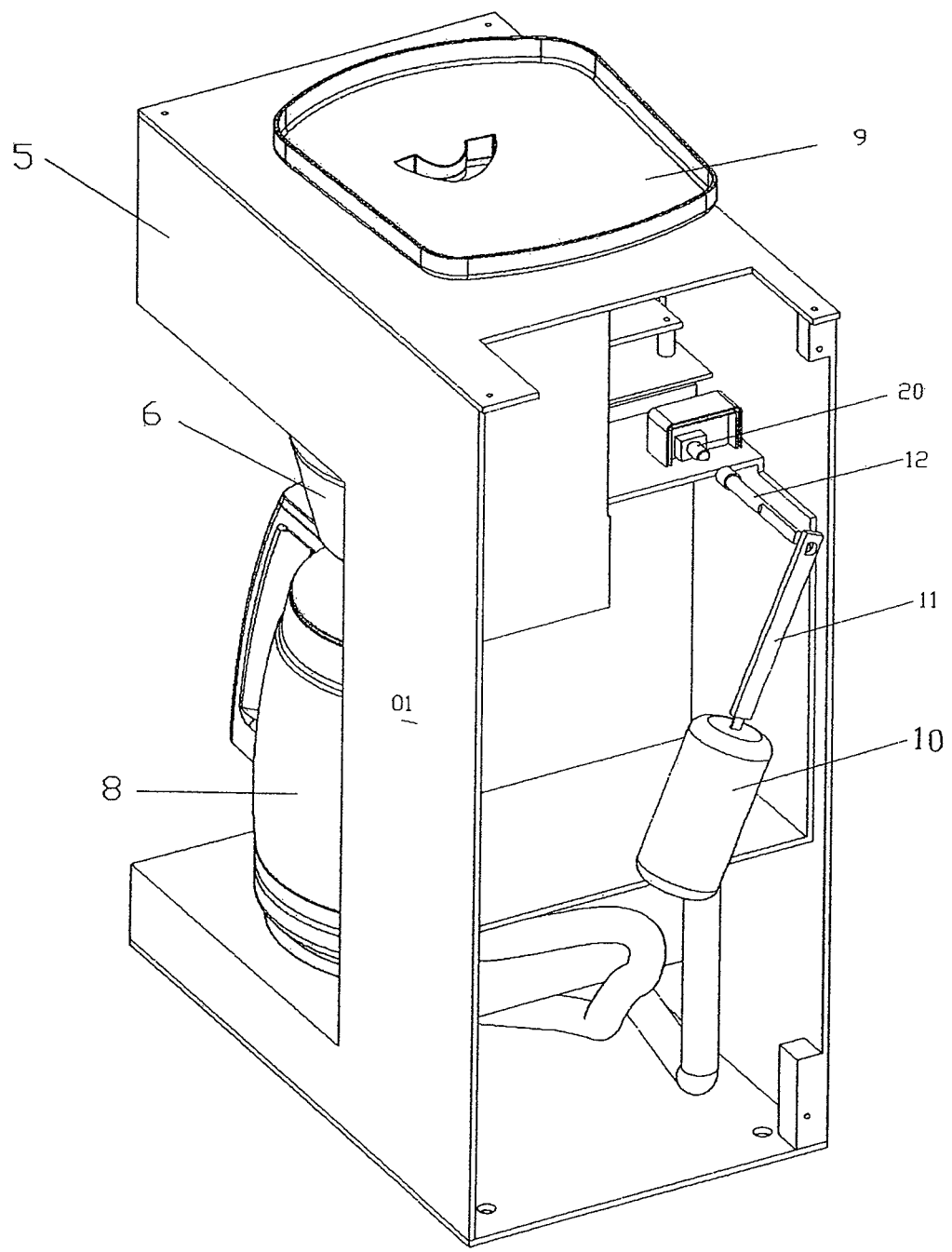
FIG. 5 is an exploded view of a water detection mechanism.

Referring specifically to FIG. 5, located within the water supplying reservoir (2) is a float-type level detector. The float-type level detector comprises a rotatably mounted shaft (12) extending into the water supplying reservoir (2) adjacent a top of the water supplying reservoir (2). At an end of the shaft (12) within the water supplying reservoir (2) is a float arm (11) which has a float (10) connected to its distal end. The float (10) floats on the top of any water within the reservoir (2). When the water level raises within the reservoir the float rises rotating the shaft (12). When the water level falls within the reservoir the float falls rotating the shaft (12) in an opposite direction. Located within the coffee maker housing at the distal end of the shaft (12) is a rotary-type variable resistor (20). The rotary-type resistor (20) is connected to the shaft (12) such that when the shaft rotates with movement of the float in response to the water level within the reservoir (2), the variable resistor is turned. Thus, by determining the position of the variable resistor (20), by measuring its resistance value, and comparing the resistance value with the mapping chart or table, the water level within the water reservoir can be determined.

Figure 2:
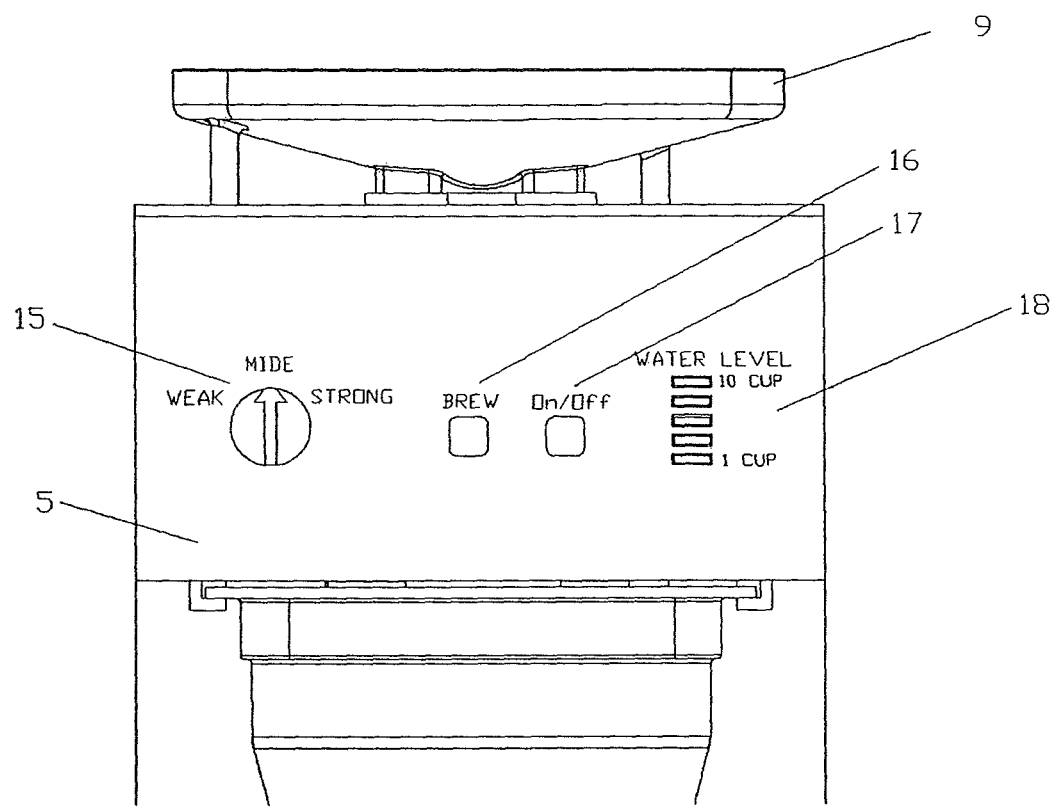
FIG. 2 is the front view of a control panel of the coffee maker.
Figure 3:
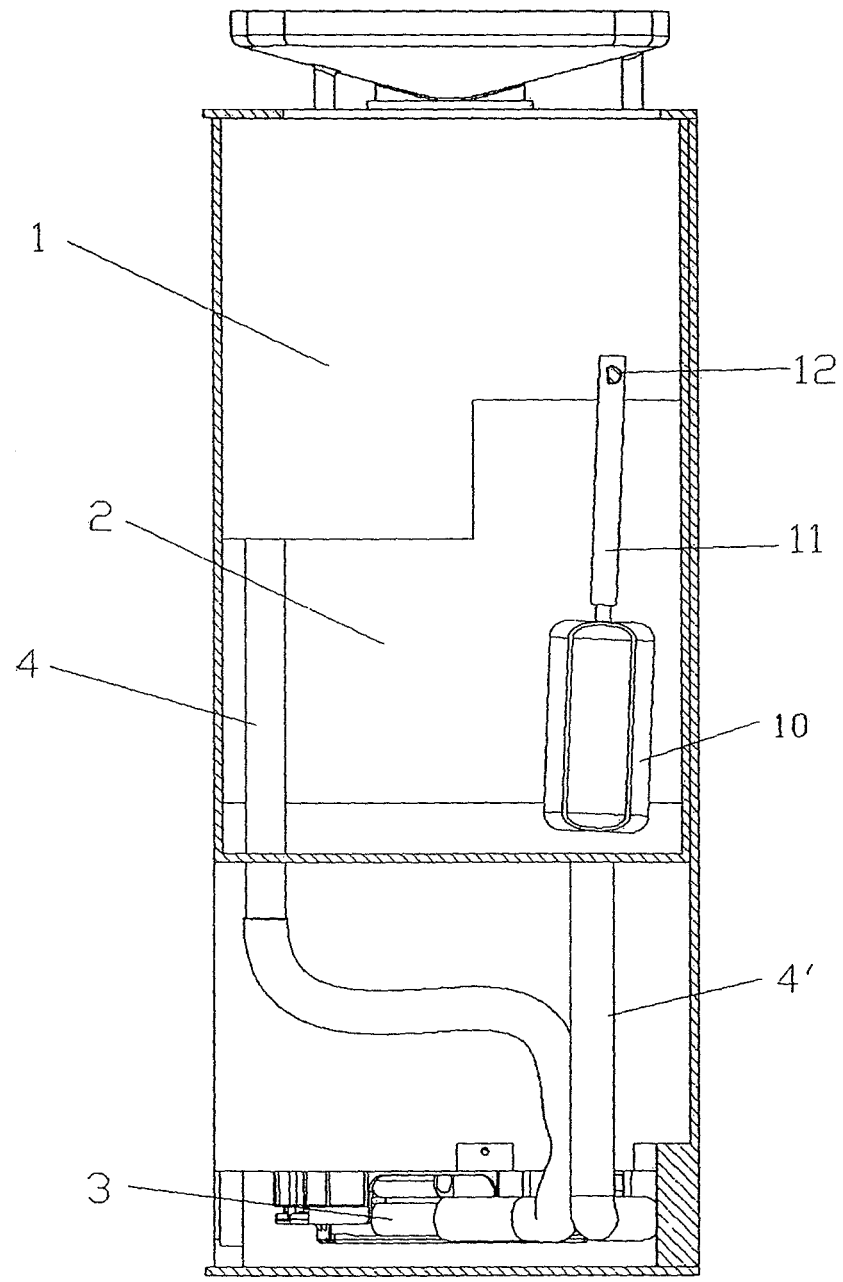
FIG. 3 is a first section view of the coffee maker.
Figure 4:
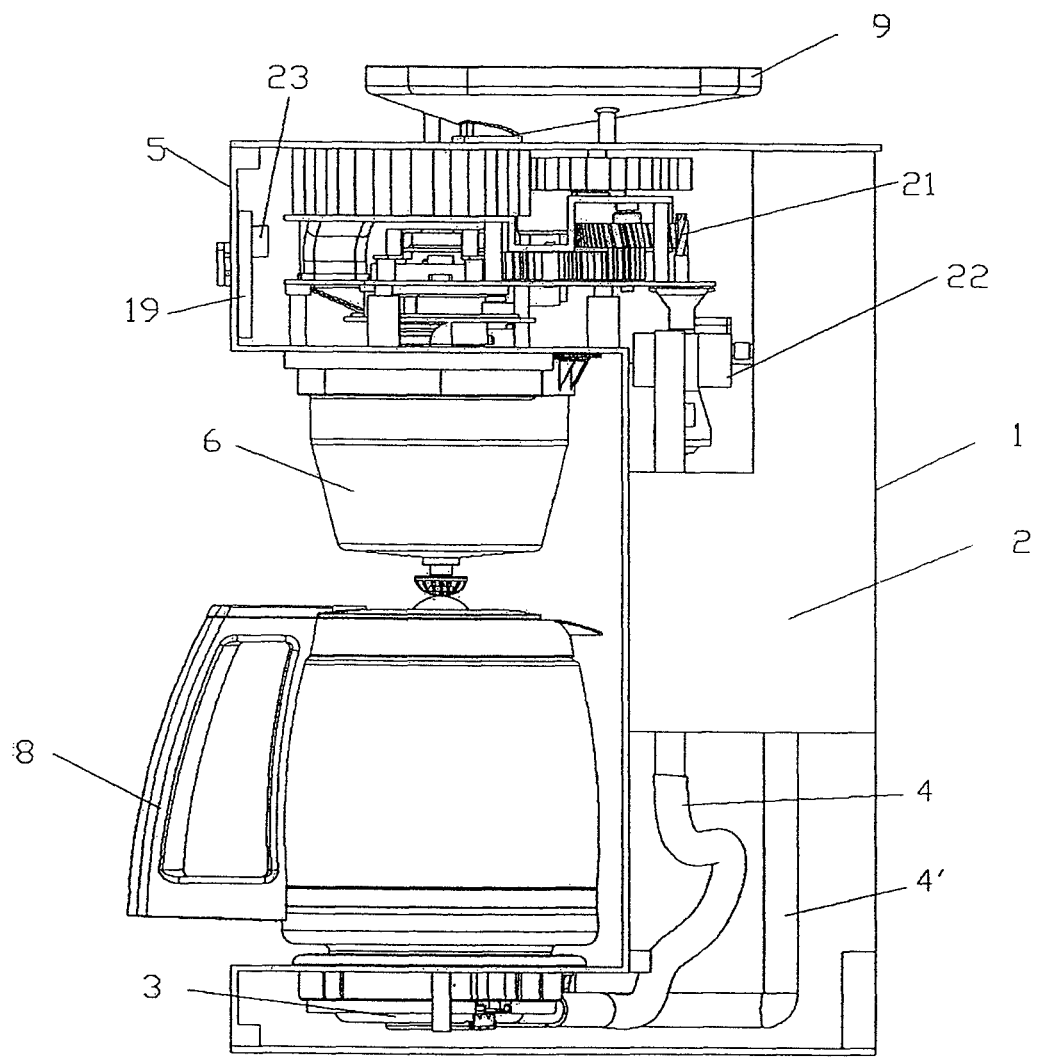
FIG. 4 is a second section view of the of the coffee maker.

In FIG. 2 there is shown a front end of the head portion (5) of the coffee maker housing which contains coffee maker controls for operating the coffee maker by a user. The controls includes a rotary switch (15) for selecting a coffee strength, for example a three position switch for allowing the selection of weak, mild and strong coffee flavours, a first push button (16) for beginning a brew cycle of the coffee maker and a second button (17) for turning the coffee maker on/off. The front panel of the coffee maker head (5) also has a water level indicator (18) which is in the form of a series of LED lights that illuminate sequentially to indicate water level in known fashion. Located within the head (5) of the housing is a circuit board (19) for example a printer circuit board (PCB) to which the input and indicate means (15, 16, 17, 18) are mounted. Also mounted to the circuit board (19) is a microprocessor (23) for controlling operation of the coffee maker. The microprocessor (23) is in communication with the inputs (15, 16, 17) and indicator (18) by electrical conductors formed on the circuit board (19) in known manner. The microprocessor (23) is also connected to the variable resistor (20) of the water level indicator and to a relay for operating the coffee grinder motor (22).

The coffee maker according to the invention overcomes problems with prior art coffee makers by an operating method which provides control quantity the amount of coffee in the brew basket (6) based upon the selected coffee strengthen—weak, mild or strong input by selector switch (15)—and/or the amount of water in the water reservoir (2). In the most basic embodiment of the invention the coffee maker is operated by the microprocessor (23) such that a fixed volume of coffee beans is deposited in the brew basket (6) based upon the setting of the strength select switch (15). For a mild brew the controller (23) operates the coffee grinder motor (22) for less time so that a minimum amount of coffee grounds are deposited in the brew basket (6). For a medium brew the controller (23) operates the grinding motor (22) for an average amount of time putting an average, or medium, amount of coffee grounds in the brew basket (6). For a strong brew the controller (23) operates the grinding motor (22) for a longer period of time at a deposit a greater amount of coffee beans in the brew basket (6). The microcontroller (23) uses the float switch in order to determine the level of water in the water reservoir (2) and indicates the water level on the water level indicator (18) viewable by the user. In this way the user can accurately fill the water reservoir (2) to a desired level based on experience. This makes it much simpler for a user to gauge the correct quantities of coffee and water for different brews and to obtain more consistent strength and flavour of coffee from consecutive brew cycles.

In an alternative, and preferred, embodiment of the invention the microcontroller operates the grinding motor (22) for different lengths of time based on both the brew strength selected via the brew selector switch (15) and on the water level within the reservoir (2). Thus, the length of time that the microprocessor (23) operates the grinding motor (22) is based not only on the strength selected but on the water level. So, for example, if a weak brew is selected and the water reservoir is full more coffee grounds are needed than if a weak brew is selected and the reservoir is half full (or half empty). A look-up or mapping table can be used by the microcontroller (23) in order to determine the amount of coffee grounds needed depending on the water level in the water reservoir (2). The water level in the water reservoir (2) can be determined by a separate mapping table mapping the resistance value of the variable resistor (20) to the water level in the reservoir (2) as previously discussed. A third mapping table can be used to map the length of time that the coffee grinding motor (22) must be operated for depositing a certain amount of coffee grounds into the brew basket (6). Alternatively, a single mapping table can be used to map a resistance value of the variable resistor (20) and a brew strength setting of the selector switch (15) to a grinding motor (22) operating time. Such arrangements of mapping tables are common in the microprocessor programming art and well within the capability of a skilled addressee. The various quantities need for a quality brew of coffee are well-known, but essential to the invention. One typical value quoted is 11 grams of grounds to 8 ounces of water.

Figure 6:
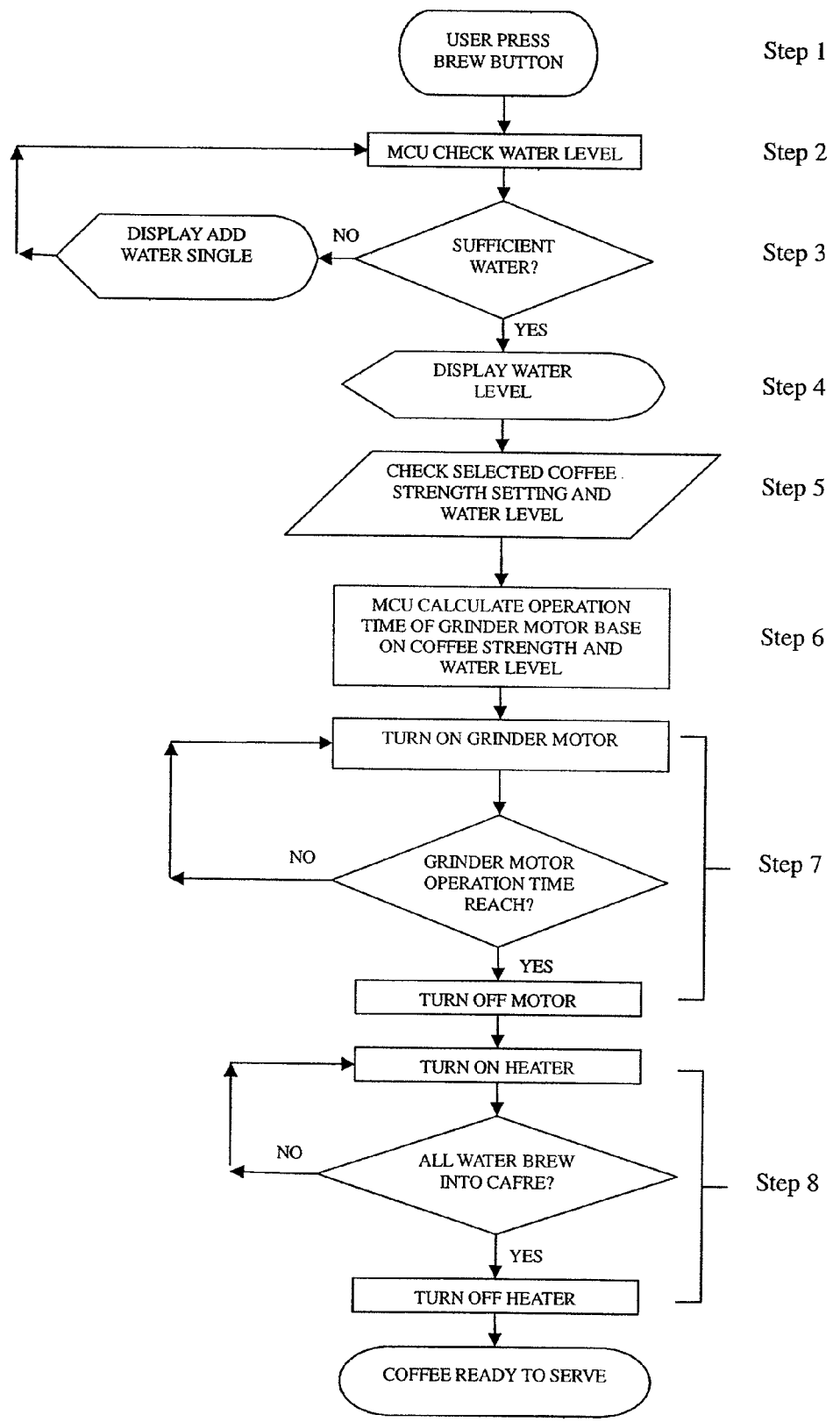
FIG. 6 is a flow chart of the operation sequence of the coffee maker.

FIG. 6 shows a preferred operating method of the invention. The method assumes that a user has placed coffee beans in the bean hopper (9) and water in the water reservoir (2). At step 1 of FIG. 6 a user processes the brew button (16). At step 2 the microprocessor (23) determines the water level within the reservoir using one of the methods described above. At step 3 the microprocessor determines whether there is sufficient water in the water reservoir for making a brew of coffee. If insufficient water is present a warning can be given to the user.

At step 4 the microprocessor displays (23) the water level within the reservoir (2) on the water level indicator (18). At step 5 the microprocessor checks a selected coffee strength set at coffee strength selector switch (15). At step 6 the microprocessor (23) calculates the preferred/needed operating time of the grinding motor (22) based on the coffee strength selection and the water level as previously described. At step 7 the microprocessor (20) operates the grinding motor (22) for the determined operating time and after the required time turns-off the grinding motor (22). At step 8 the microprocessor (23) operates the in-line water heater (3) to heat water in the water reservoir (2) and deliver it to the brew basket (6). The microprocessor (23) continues to operate the water heater (3) until all the water in the reservoir (2) is used up. This can be determined via the water level float switch. A safety thermostat to shut-off the water heater (3) should the reservoir (2) run dry can also be included. After the water heater (3) is switched off the coffee is ready to serve.

Thus, according to the invention there is a coffee maker and a method of operating a coffee maker which can repeatedly produce a consistent strength and flavour coffee brew regardless of the number of cups or the varying tastes of the user.

In the above-described embodiment various preferred examples are given. It must be appreciated that improvements and/or modifications obvious to those skilled in the art are not excluded from the scope of the present invention. For example, in the description a float-type water level detection means is included. Various other mechanical or electronic water level detectors and sensors are known in the art and should be considered within the scope of the present invention.

What is claimed is:

1. A coffee maker including:
   a water reservoir for holding water for brewing coffee,
   an in-line water heater for heating water from the water reservoir for brewing coffee,
   a brew basket for receiving ground coffee,
   a water passage extending from the water reservoir to the brew basket, wherein the water passage passes through the in-line water heater for heating water flowing through the water passage from the water reservoir to the brew basket so that heated water is delivered to the brew basket,
   a water level sensor located in the water reservoir and producing a water level signal indicating quantity of water in the water reservoir,
   a water level indicator indicating the quantity of water in the water reservoir sensed by the water level sensor,
   a coffee bean grinder in communication with the brew basket,
   an electric motor driving the coffee bean grinder,
   a user input for selecting between at least two user selectable brewed coffee strengths, and
   a controller in communication with the water level sensor, the water level indicator, the electric motor, and the user input, wherein the controller
      activates the water level indicator in response to a signal from the water level sensor, and
      determines operating time of the electric motor in response to the water level signal received from the water level sensor and the brewed coffee strength selected at and received from the user input.

2. The coffee maker of claim 1 wherein the water level sensor comprises a float and a variable resistance device operated in response to position of the float.

3. The coffee maker of claim 1 wherein the water level indicator comprises a plurality of lights independently controllable by the controller.

4. The coffee maker of claim 1 wherein the coffee bean grinder produces specific quantities of coffee grounds in corresponding operating times of the electric motor.

5. The coffee maker of claim 1 wherein the user input includes a switch for selecting from, as the selectable brewed coffee strengths, weak coffee, mild coffee, and strong coffee.

* * * * *